Patented June 16, 1936

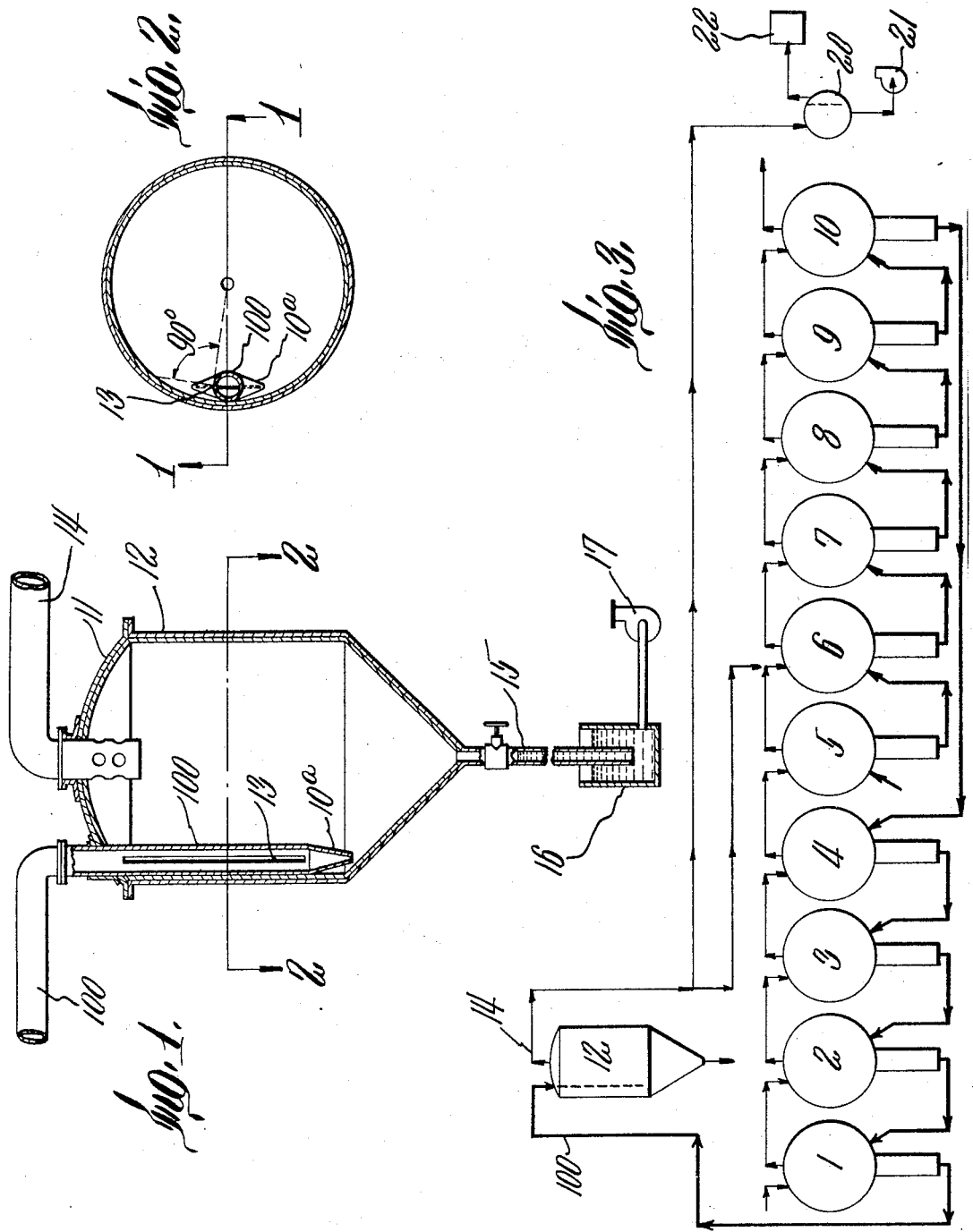

2,044,095

UNITED STATES PATENT OFFICE 2,044,095

EVAPORATING PROCESS AND APPARATUS THEREFOR

Hugh K. Moore, Berlin, N. H., assignor to Brown Company, Berlin, N. H., a corporation of Maine Application November 3, 1933, Serial No. 696,546

10 Claims. (Cl. 159—17)

This invention relates to an evaporating or concentrating process and apparatus therefor. It relates, for instance, to a process carried out in multiple stages or effects and involving the heating of the liquor at elevated temperature and under pressure in the last stage evaporator or effect.

In evaporating or concentrating liquors containing dissolved solids of a crystallizable or colloidal nature, the last stages of evaporation or concentration of the liquor may be attended by a separation of some of the solids therefrom. For example, when spent chemical pulping liquors, such as those arising from the production of kraft pulp, are subjected to a multi-stage evaporative treatment to concentrate such liquors to a condition where their organic content may be burned successfully and their inorganic content smelted, the sodium sulphate and sodium carbonate present in such liquors may crystallize out in the last stages of evaporation and more especially in the last-stage evaporator or effect which is usually operated at an elevated temperature such that the concentrated liquors delivered therefrom carry considerable sensible heat.

In accordance with the present invention, the liquor carrying considerable sensible heat is exhausted from the last-stage evaporator, that is, the one into which the highest temperature steam is introduced, into a tank maintained under lower pressure than the last-stage evaporator, whereby the sensible heat in excess of that left in the liquor as it is delivered from the tank, hereinafter called the "flash tank", is utilized in vaporizing more liquid from the liquor. When the liquor is one that already carries separated solids as it comes from the last-stage evaporator and contains still more separable solids therein, the flashing into steam caused in the flash tank is accompanied by the separation of more solids therefrom.

While the principles of my invention are applicable to a wide variety of liquors containing solids dissolved therein and put through an evaporating or concentrating treatment, they are of especial utility when it is desired to effect a separation of solids after the last-stage evaporation either for the purpose of avoiding decomposition of the separated solids on account of heat or for the purpose of safeguarding the last-stage evaporators against injury on account of the erosive action of the solids. In the case of liquors containing colloidal materials, like eggs, glue, milk, etc., it may be desirable to flash the partially concentrated liquor as it comes from the last-stage evaporator at comparatively low temperatures so as to realize further vaporization of liquid without decomposing the separating solids or the solids remaining in the final liquor. Thus, in such case, the concentrated liquor coming from the last-stage evaporator may be at a temperature of, say, about 140° F., whereas the liquor delivered from the flash tank may be at a temperature of about 90° F. In the case of other liquors, for instance, those containing inorganic compounds dissolved therein, the question of chemical decomposition does not have to be considered, wherefore, it may be the desirable practice to carry out the last stage of evaporation at much higher temperatures, for instance, those attainable under superatmospheric pressure. This is true in the case of spent kraft cooking liquors or a caustic soda solution containing salts, such as sodium sulphate, sodium sulphide or sodium chloride, which may be subjected advantageously to a last-stage of evaporation under temperatures attainable only under superatmospheric pressure. In such case, when the liquor coming from the last-stage evaporator is delivered into the flash tank, considerable sensible heat of the liquor is available for flashing water into steam.

I shall now deal with an illustrative application of my invention to spent kraft cooking liquors which, as already indicated, may advantageously be subjected to a last-stage evaporative treatment with the highest temperature steam used in the system. Thus, the last effect in a four-evaporator system in which such liquor is discharged from the effect or evaporator in which the highest temperature steam is being introduced, may discharge such liquor in commercial practice at a temperature of about 212° F., more or less, depending upon the amount of heating surface in the evaporating system. As the number of effects or evaporators in a system is increased, the temperature of the liquor coming from the last-stage evaporator or effect will, in commercial practice, increase, the extent of increase depending upon the amount of heating surface in the system and the successive raises in the boiling point of the liquor in the various effects. Thus, a ten-effect system for spent kraft cooking liquor may include a last effect or evaporator discharging the concentrated liquor at a temperature as high as 270° to 300° F.

When operating with such a system, it is possible to concentrate the liquor in the system to a point where considerable sodium sulphate and sodium carbonate are thrown out of solution in crystallized form, largely anhydrous. It would be desirable to carry the concentration even further, that is, to a point where even more crystallized salts are thrown out of solution, but the crystallized salts not only detract from the efficiency of the system, but, being of an erosive nature under the high velocities of liquor circulation prevailing in the system, they tend to corrode the last-stage evaporators and the pumps so utilized therefor so badly that it is uneconomical to go beyond a certain stage of crystallization in the system. By practicing the present invention, however, according to which the liquor from the last-stage evaporator is delivered into the flash tank, which is preferably maintained under a pressure of two inches to four inches of mercury absolute, it is possible to flash or vaporize considerable of the water of the concentrated liquor into steam and thereby to realize the separation of crystals which could not be economically effected in the evaporating system. To this end, the flash tank may be lined with inexpensive material to which easy access may be had for replacement; or it may be lined with expensive material which withstands for long periods the erosive action of the crystallized solids projected thereon at high velocities. In consequence of the much lower temperature of the liquid delivered from the flash tank, the heat losses in the pipe line delivering the liquor from the flash tank are much lower than if the liquor were piped from the last-stage evaporator. Moreover, the pipe delivering the liquor from the flash tank does not tend to become clogged with crystals, as is the tendency when the liquor is passed therethrough at much higher temperatures and containing much more crystallizable material in solution therein which tends to deposit out on the pipe as the liquor is being cooled therein. Again, by virtue of the greater concentration of colloidal organic material in the liquor delivered from the flash tank, there is less tendency for crystals to grow therein to a large size such as makes for plugging of the delivery pipe.

On the accompanying drawing,

Figure 1 illustrates a vertical section through a flash tank such as may be used in accordance with my invention.

Figure 2 represents a horizontal section through the tank.

Figure 3 illustrates diagrammatically and conventionally an entire system wherein the flash tank is used accordant with my invention.

As already indicated, the liquor from the last-stage evaporator in a system operating upon spent kraft liquor may be at a temperature as high as 270° to 300° F., and may already contain in suspension therein some crystallized sodium sulphate and sodium carbonate. In such case, the last stages or effects in the system are operated with the liquor and the successive steams being passed through such stages in countercurrent flow, that is, with the highest temperature steam operating upon the most concentrated liquor in the last stage or effect, from which last stage or effect the liquor is discharged. This is commonly termed backward flow evaporation. A ten-effect system being thus operated is illustrated in Figure 3, the liquor following the course indicated by the heavy line and arrows and the successive steams following the course indicated by the light line and arrows. It is to be observed that the liquor enters the effect 5 and proceeds through the effects 6, 7, 8, 9 and 10, and thence backward through the effects 4, 3, 2 and 1, from which last effect 1 it is discharged into a cylindrical flash tank 12. It is to be further observed that the highest temperature steam enters the effect 1 and that the successive steams proceed through the successive effects 2, 3, 4, 5, 6, 7, 8, 9 and 10.

The flash tank 12 is shown stationed with its axis extending vertically and provided with a hopper bottom. The most concentrated liquor is delivered from the last-stage evaporator 1 through a pipe line 100 which enters through the top 11 of the flash tank 12. The pipe 100 is shown extending vertically down through the tank 12 adjacent to its internal wall and terminating somewhat removed from the hopper bottom. It is shown provided with a narrow, elongated vertical slot 13 running parallel to the axis of the tank and through which the liquor explodes substantially perpendicularly to the radii of the tank at the slot and against the internal wall of the tank, flashing partly into steam and becoming more concentrated so as to throw out additional crystallized solids in finely divided form. The location of the pipe 100 adjacent to the internal wall of the tank and the direction of the explosive emission of the liquir through the slot 13 against the internal wall of the tank is hence such as will occasion minimum splashing and such as will create a maximum cyclone or whirl in the tank above its bottom, the most violent zone of the cyclone being near the top of the tank where the liquor explodes with maximum violence. In consequence of the great difference between the specific gravity of the liquor and the crystallized solids and that of the liberated steam, the liquor and the crystallized solids are carried to the periphery of the cyclone, that is, against the internal wall of the tank, whereas the liberated steam accumulates at the center of the cyclone and rises, the steam being withdrawn by a pipe 14 shown entering centrally into the tank through its top. The upper end of the emission slot 13 preferably terminates at a point slightly removed from the top of the tank and its lower end at a point somewhat removed from the lower end of the pipe 100, thereby ensuring maximum cyclonic action near the top of the tank where such action is desired. The pipe 100 is preferably open at its lower end but constricted or tapered at its lower end portion 10a, as shown, in order to permit such crystals as are not discharged through the slot 13 to pass through the lower end of the pipe to the bottom of the tank. By constricting the lower end portion of the pipe 100, maximum cyclonic action is ensured where desired in the tank, since very little liquor and solids can be discharged through the lower end of the pipe. Such small amounts of liquor, solids and steam as are emitted through the lower end of the pipe separate into two portions, namely, liquor and solids which go to the bottom of the tank and steam carrying entrained liquor and solids, which latter portion, however, enters into and becomes part of the cyclone wherein complete separation of the steam from such entrained liquor and solids occurs, since, as the steam and its entrainments rise in the cyclone, the steam works toward the center whereas the liquor and solids work toward the periphery. If the lower end of the pipe 100 were closed, fine crystals would accumulate in the lower end portion and grow as a single solid mass up to and beyond the lower end of the slot 13 so as to clog part of the slot and thereby cut down the desired height of the cyclone.

As already indicated, sufficient suction may be put on the exhaust pipe 14 by a suction pump to reduce the pressure to, say, about 2 to 4 inches of mercury absolute in the flash tank 12. Thus, the vapor from the flash tank 12 is shown in Figure 3 as proceeding to a condenser 20 from which the condensate is removed by a pump 21 and from which the air is exhausted by a vacuum pump 22 capable of maintaining the desired degree of sub-atmospheric pressure in the flash tank. The liquor and crystals falling to the bottom of the tank may leave through an elongated vertical pipe 15 (shown largely broken away) leading to a tank 16, a sufficient leg of liquor being maintained in the pipe 15 to seal the tank against the entrance of air thereinto. It is thus seen that the steam is removed from the center, preferably the top center, of the cyclone created in the flash tank, whereas the liquor and the crystals are removed from the bottom of the tank where the cyclonic action is low or nil. This feature of my process is highly important, as it is most effective in ensuring against the entrainment of either liquor or solids in the steam. The liquor may be removed from the tank 16 by a centrifugal pump 17 and delivered to a storage tank (not shown) wherein make-up sodium sulphate may be added to the liquor, as usual, before it is sent to the recovery furnace.

As already indicated, the lining of the tank 12 may be constructed from comparatively inexpensive steel or cast iron so that relining may be done at comparatively low cost. Preferably, however, the pipe 100 and the entire lining is constructed from a chromium steel alloy of that type, for instance, "KA4", which hardens when frictional stresses are applied thereto. In any event, the pipe 100 and that portion of the lining against which the liquor impinges with explosive violence is preferably made of such chromium steel alloy so as to minimize the wear at such localities.

My invention, although highly useful in the evaporative treatment of spent chemical pulping liquors, especially spent kraft liquors undergoing evaporation under the conditions hereinbefore described, may be extended to the evaporative treatment of other liquors. When the maximum flash is not desired in the flash tank, the flash tank may be connected, as indicated by the line shown in Figure 3, with the steam space of one of the evaporators or effects, say, #6, which is operated at a temperature lower than that of the liquor introduced into the flash tank, in which case the condensing temperature of the steam in such evaporator or effect governs the final temperature to which the liquor may flash in the flash tank, and the heat value of the steam liberated in the flash tank is utilized in such evaporator or effect and in the succeeding ones operated at lower temperatures.

There are other features of the particular embodiment of my invention hereinbefore described which are subject to variation. For instance, while the flash tank has been described and illustrated as being arranged with its axis extending vertically, since this is the preferred arrangement, nevertheless, it is to be understood that it is possible to arrange the tank with its axis inclined to the horizontal or even in a horizontal position so long as the tank is provided with an internal cylindrical wall and the liquor is flashed thereinto through an emission pipe which emits the liquor in a direction designed to create the desired cyclonic action in the tank. In any such case, too, the vapor substantialy devoid of entrained liquor and solids can be removed from the center of the cyclone and the liquor and the solids from the periphery or below the cyclone, by providing suitable outlet pipes for such purpose, as hereinbefore described. It is, of course, possible to provide the pipe 100 with a series of perforations rather than a single elongated slot 13 so as to emit the liquor in the flash tank as a series of sprays or jets, but this is less desirable than a single discharge through the elongated slot, since there is a tendency to plug the perforations and less violent cyclonic action is created at the upper portion of the tank where maximum cyclonic action is desired. So, too, it is possible to emit the liquor in the flash tank as sprays or jets through a series of pipes arranged horizontally and tangentially next to the internal wall of the tank, but this sort of an arrangement is more expensive and even less desirable because there are more pipes and parts to wear and to keep clean.

I claim:

1. In a process involving the subjection of a liquor containing dissolved solids to multiple effect evaporating treatment wherein the last effects are operated with backward flow of the liquor, those steps which comprise flashing the liquor coming from the last effect into a space maintained at lower pressure than said last effect to cause flashing of liquid into vapor and to cause further concentration of such liquor, removing the vapor and liquor separately from said space at a temperature lower than that at which the liquor came from said last effect, and utilizing the separated vapor in the evaporative treatment.

2. Apparatus of the class described, comprising a cylindrical tank having a hopper bottom and whose axis extends vertically, and a slotted pipe entering vertically into said tank and adjacent to the internal wall thereof, said slot being so arranged that fluid emitted therethrough can create a cyclone in said tank.

3. Apparatus of the class described, comprising a cylindrical tank having a hopper bottom and whose axis extends vertically, and a slotted pipe entering vertically into said tank and adjacent to the internal wall thereof, said slot being arranged to emit fluid fed into said pipe substantially perpendicularly to the radii of the tank at said slot.

4. Apparatus of the class described, comprising a cylindrical tank whose axis extends vertically, and a slotted pipe having an open lower end and entering vertically into said tank adjacent to the internal wall thereof, said slot being so arranged that fluid emitted therethrough can create a cyclone in said tank and terminating short of the lower end of said pipe and the lower end portion of said pipe being constricted.

5. In a process of concentrating a liquor containing solids dissolved therein, those steps which comprise heating the liquor under superatmospheric pressure to boiling temperature, exploding such liquor thus heated into a space maintained at considerably lower pressure under conditions to create a cyclone in such space, thereby causing solvent to flash into vapor to constitute the center of said cyclone and concentration of such liquor at the periphery of said cyclone, and removing the vapor from the center of the cyclone substantially without entrainment of the concentrated liquor.

6. In a process of concentrating a liquor containing solids dissolved therein, those steps which comprise concentrating the liquor at elevated temperature attainable only under superatmospheric pressure to a stage where the solids dissolved therein are ready to separate out upon the evaporation of more solvent therefrom, delivering such concentrated liquor into a space maintained at not greater than atmospheric pressure under conditions to create a cyclone in said space, thereby causing solvent to flash into vapor to constitute the center of said cyclone and solids to separate from solution at the periphery of said cyclone, and removing the vapor from the center of the cyclone substantially without entrainment of the concentrated liquor or the separated solids.

7. In a process of concentrating a liquor containing crystallizable solids dissolved therein, those steps which comprise concentrating the liquor at elevated temperature attainable only under superatmospheric pressure to a stage where such solids are ready to crystallize out upon the evaporation of more solvent therefrom, delivering such concentrated liquor into a space maintained at subatmospheric pressure under conditions to create a cyclone in said space, thereby causing solvent to flash into vapor to constitute the center of said cyclone and crystallized solids to separate from solution at the periphery of said cyclone, and removing the vapor from the center of the cyclone.

8. In a process of concentrating a spent kraft cooking liquor containing dissolved sodium sulphate and sodium carbonate, those steps which comprise concentrating the liquor at elevated temperature attainable only under superatmospheric pressure to a stage where the dissolved sodium sulphate and sodium carbonate are ready to crystallize out upon the evaporation of more water therefrom, delivering such concentrated liquor into a space maintained at subatmospheric pressure under conditions to create a cyclone in said space, thereby causing water to flash into vapor to constitute the center of said cyclone and crystallized sodium sulphate and sodium carbonate to separate from solution at the periphery of said cyclone, and removing the vapor from the center of the cyclone.

9. In a process of concentrating a liquor containing solids dissolved therein, those steps which comprise heating the liquor to a temperature such that flashing of the solvent into vapor takes place when it is exposed to subatmospheric pressure, delivering the liquor thus heated into a space maintained under subatmospheric pressure under conditions to create a cyclone in said space, thereby causing solvent to flash into vapor to constitute the center of said cyclone and concentration of the liquor at the periphery of said cyclone, and removing the vapor from the center of the cyclone.

10. In a process of concentrating a liquor containing crystallizable solids dissolved therein, those steps which comprise concentrating the liquor to a stage where such solids are ready to crystallize out upon the evaporation of more solvent therefrom, such concentration being effected at an elevated temperature such that flashing of the solvent into vapor takes place when it is exposed to subatmospheric pressure, delivering such concentrated liquor into a space maintained at subatmospheric pressure under conditions to create a cyclone in said space, thereby causing solvent to flash into vapor to constitute the periphery of said cyclone and crystallized solids to separate from solution at the periphery of said cyclone, and removing the vapor from the center of the cyclone.

HUGH K. MOORE.